(12) United States Patent
Roshen

(10) Patent No.: US 8,364,745 B2
(45) Date of Patent: Jan. 29, 2013

(54) SERVICE ORIENTED ARCHITECTURE ENTERPRISE SERVICE BUS WITH UNIVERSAL PORTS

(75) Inventor: Waseem A. Roshen, Hilliard, OH (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 12/625,331

(22) Filed: Nov. 24, 2009

(65) Prior Publication Data

US 2011/0125821 A1    May 26, 2011

(51) Int. Cl.
*G06F 15/16* (2006.01)
(52) U.S. Cl. .......................... 709/201; 370/466; 370/392
(58) Field of Classification Search .................... 709/201
See application file for complete search history.

(56) References Cited

U.S. PATENT DOCUMENTS

| | | | |
|---|---|---|---|
| 6,785,274 B2 | 8/2004 | Mahajan et al. | |
| 7,548,514 B1* | 6/2009 | Choudhury et al. | 370/236 |
| 7,626,982 B2 | 12/2009 | Akadiri | |
| 7,783,782 B2 | 8/2010 | Cromp et al. | |
| 7,814,226 B2 | 10/2010 | Patrick | |
| 7,870,295 B2 | 1/2011 | Johnson | |
| 7,966,373 B1* | 6/2011 | Smith et al. | 709/206 |
| 7,991,840 B2 | 8/2011 | Boyer et al. | |
| 8,095,670 B2 | 1/2012 | Brown et al. | |
| 8,112,434 B2 | 2/2012 | Patten, Jr. et al. | |
| 8,139,569 B2 | 3/2012 | Akadiri | |
| 8,140,582 B2 | 3/2012 | Chen et al. | |
| 8,166,130 B2 | 4/2012 | Reinart | |
| 2002/0186694 A1* | 12/2002 | Mahajan et al. | 370/390 |
| 2004/0049714 A1* | 3/2004 | Marples et al. | 714/43 |
| 2006/0101115 A1* | 5/2006 | Gleckman | 709/203 |
| 2007/0162421 A1 | 7/2007 | Pang et al. | |

(Continued)

FOREIGN PATENT DOCUMENTS

| | | |
|---|---|---|
| EP | 1855218 A2 | 11/2007 |
| WO | 2006113092 A2 | 10/2006 |

(Continued)

OTHER PUBLICATIONS

Papazoglou et al., "Service Oriented Architectures: Approaches, Technologies and Research Issues", VLDB Journal, Springer Berlin / Heidelberg, vol. 16, No. 3, Jul. 2007, pp. 389-415(27).

(Continued)

*Primary Examiner* — Firmin Backer
*Assistant Examiner* — Hamza Algibhah
(74) *Attorney, Agent, or Firm* — Yee & Associates, P.C.; John Pivnichny

(57) ABSTRACT

A universal ESB port for connecting applications to an enterprise service bus (ESB). The universal ESB port receives a message from an application requesting a service. The universal ESB port is capable of receiving and processing messages in any messaging format and any communication protocol. The universal ESB port determines, from the message, a communication protocol of the source application. The message is processed to extract a body of the message, and the message body is examined to determine a messaging format of the source application. The message is converted from the messaging format of the source application to a common messaging format understandable by the enterprise service bus to form a common formatted message. The common formatted message is then sent to the main body of the enterprise service bus.

20 Claims, 7 Drawing Sheets

U.S. PATENT DOCUMENTS

| | | | |
|---|---|---|---|
| 2008/0069124 A1 | 3/2008 | Patrick | |
| 2008/0086370 A1 | 4/2008 | Narayanaswami et al. | |
| 2008/0120380 A1 | 5/2008 | Boyd et al. | |
| 2008/0130682 A1* | 6/2008 | Akadiri | 370/469 |
| 2008/0140857 A1 | 6/2008 | Conner et al. | |
| 2008/0187004 A1* | 8/2008 | Johnson | 370/474 |
| 2008/0306751 A1* | 12/2008 | Conroy et al. | 705/1 |
| 2009/0018998 A1 | 1/2009 | Patten, Jr. et al. | |
| 2009/0049040 A1 | 2/2009 | Fay et al. | |
| 2009/0063522 A1 | 3/2009 | Fay et al. | |
| 2009/0070456 A1 | 3/2009 | Brown et al. | |
| 2009/0070790 A1 | 3/2009 | Gilfix et al. | |
| 2009/0089078 A1 | 4/2009 | Bursey | |
| 2009/0125332 A1 | 5/2009 | Martin | |
| 2009/0132698 A1 | 5/2009 | Barnhill, Jr. | |
| 2009/0193096 A1 | 7/2009 | Boyer et al. | |
| 2009/0210408 A1 | 8/2009 | Boyer et al. | |
| 2009/0221310 A1* | 9/2009 | Chen et al. | 455/466 |
| 2009/0235167 A1 | 9/2009 | Boyer et al. | |
| 2009/0307321 A1* | 12/2009 | Sawant | 709/206 |
| 2009/0319686 A1* | 12/2009 | Watanabe | 709/240 |
| 2010/0005466 A1* | 1/2010 | MacFarlane et al. | 718/100 |
| 2010/0030855 A1* | 2/2010 | Akadiri | 709/204 |
| 2010/0037237 A1* | 2/2010 | Reinart | 719/313 |
| 2010/0042670 A1* | 2/2010 | Kamalakantha et al. | 709/203 |
| 2010/0061382 A1* | 3/2010 | Hulse et al. | 370/400 |
| 2010/0088326 A1* | 4/2010 | Chen et al. | 707/756 |
| 2010/0124227 A1* | 5/2010 | Williams et al. | 370/392 |
| 2010/0150169 A1* | 6/2010 | Brown et al. | 370/466 |
| 2010/0159961 A1* | 6/2010 | Bowman et al. | 455/466 |
| 2010/0161362 A1* | 6/2010 | Shapira et al. | 705/7 |
| 2010/0208875 A1* | 8/2010 | Vandenbulcke et al. | 379/114.01 |
| 2010/0223344 A1* | 9/2010 | Little | 709/206 |

FOREIGN PATENT DOCUMENTS

| | | |
|---|---|---|
| WO | 2008078366 A1 | 12/2006 |

OTHER PUBLICATIONS

Soto-Carrion et al., "General Ontology Service Engine (GORSE): a new approach to integrate the semantic web knowledge on service oriented architectures", pp. 1-22 retrieved Nov. 2009 http://www.imai-software.com/openlab/data/GORSE_DRAFTv0_1.pdf.

"osESB Documentation, Part 1: The SOA Stack and the ESB", Nov. 5, 2007, pp. 1-22 http://www.osesb.org/documentation/The%20SOA%20Stack%20and%20the%20ESB.pdf.

Pohlsen et al., "A Concept for a Medical Device Plug-and-Play Architecture based on Web Services", pp. 1-7, retrieved Oct. 20, 2009 http://sigbed.seas.upenn.edu/archives/2009-07/SchlichtingSIGBED.pdf.

U.S. Appl. No. 13/078,483, filed Apr. 1, 2011, Roshen.

"CG 6000 Series—Platform for the New Era of Communications—Open Access Product Data Sheet," NMS Communications, www.nmscommunications.com, accessed Mar. 21, 2011, 4 pages.

"Mule ESB—The Leading Open Source Enterprise Service Bus," Web Middleware Company, www.mulesoft.com, accessed Mar. 2011, 2 pages.

Gupta, "Enterprise Service Bus Capabilities Comparison," Project Performance Corporation, Apr. 2008, 21 pages.

* cited by examiner

SERVICE ORIENTED ARCHITECTURE ENTERPRISE SERVICE BUS WITH UNIVERSAL PORTS

BACKGROUND

1. Field

The disclosure relates generally to an improved data processing system, and more specifically to a computer implemented method, apparatus, and computer program product for providing an enterprise service bus for connecting various applications together using a universal port type.

2. Description of the Related Art

A Service Oriented Architecture (SOA) is a collection of services that communicate with one another over a network in order to carry out business processes. Communication in a service oriented architecture can involve the simple passing of data or can involve two or more services that coordinate some activity. Such services are loosely coupled (meaning that one application does not need to know the technical details of another application in order to communicate with the other application), have well-defined platform independent interfaces, and are reusable. In general, a service-oriented approach enables one or more businesses to link together fragmented data and business processes in order to create a more complete view of operations.

A service in a service oriented architecture is a function which can be invoked via an implementation-independent interface. A service provider is an entity that offers a service to other entities, and an entity that makes use of a service by triggering its execution is a service requestor. A service oriented architecture provides flexibility by allowing a service requestor to discover and invoke a service dynamically based on the pre-published service interface (i.e., the description of the functionality provided by the service). A service request may be processed by one of multiple possible service providers. An intermediary, such as an Enterprise Service Bus (ESB), typically determines the particular service provider implementation to be used to process the request. The enterprise service bus is used to connect applications so that the functionality and data owned by one application can be shared across all applications connected to the enterprise service bus.

SUMMARY

The illustrative embodiments provide a computer implemented method, apparatus, and computer program product for an enterprise service bus for connecting various applications together using a universal port type. A universal enterprise service bus port receives, from a source application in a set of applications connected to the enterprise service bus, a message requesting a service from another application in the set of applications. Each application in the set of applications is connected to the enterprise service bus via the universal enterprise service bus port, and each application uses a different combination of messaging format and communication protocol. The universal enterprise service bus port is capable of receiving and processing messages in any messaging format and any communication protocol. The universal enterprise service bus port determines, from the message, a communication protocol of the source application. The message is processed to extract a body of the message, and the message body is examined to determine a messaging format of the source application. The message is converted from the messaging format of the source application to a common messaging format understandable by the enterprise service bus to form a common formatted message. The common formatted message is then sent to a main body of the enterprise service bus.

DETAILED DESCRIPTION

Figure 1:
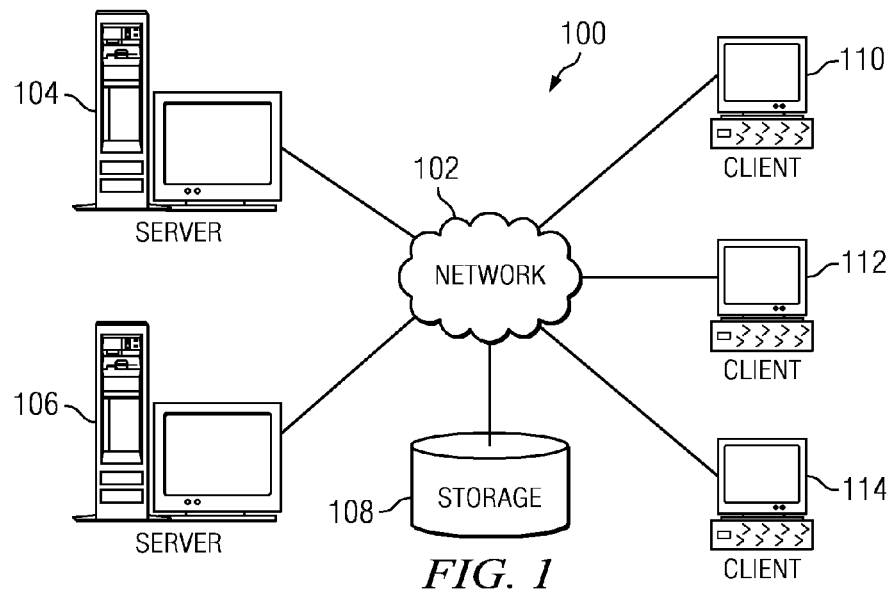
FIG. 1 depicts a pictorial representation of a network of data processing systems in which the illustrative embodiments may be implemented.

As will be appreciated by one skilled in the art, aspects of the disclosure may be embodied as a system, method or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the aspects of the disclosure may be written in any combination of one or more programming languages, including an object oriented programming language such as Java, Smalltalk, C++, Voice eXtensible Markup Language (VXML) or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The aspects of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
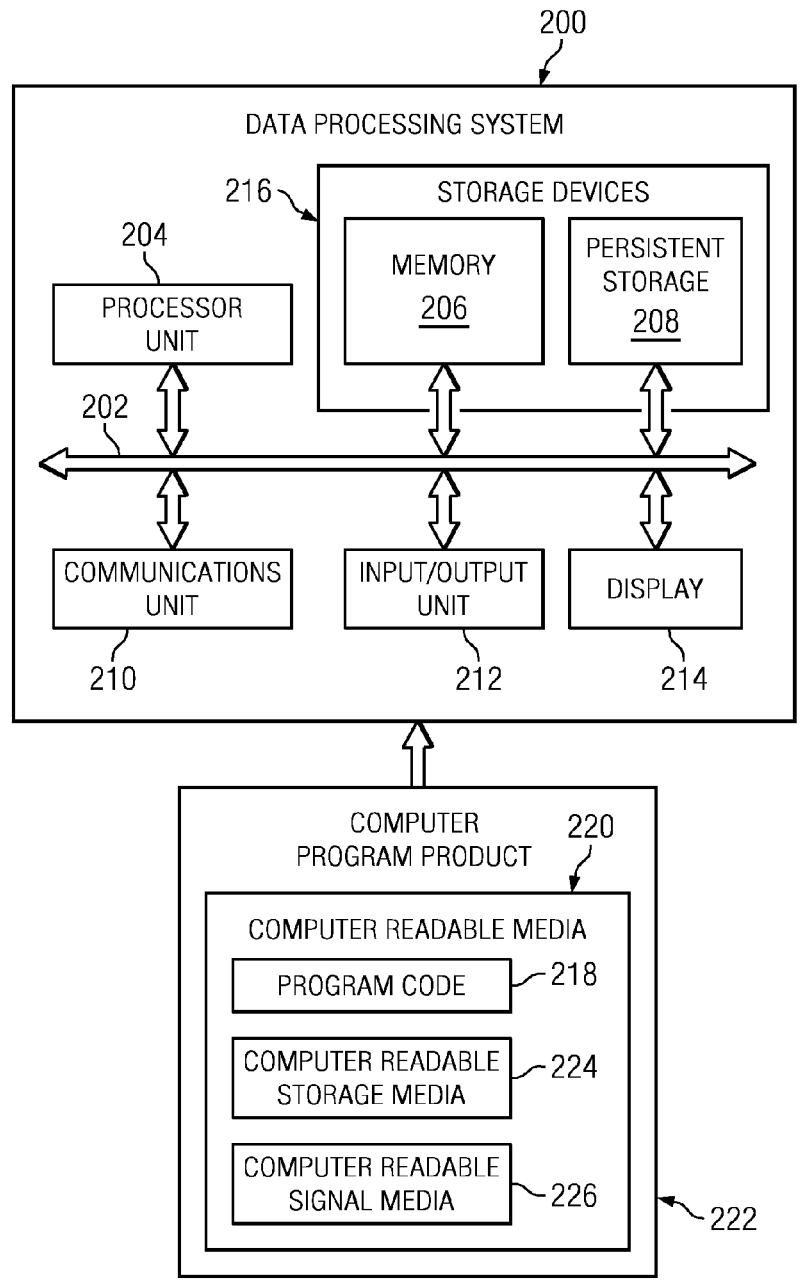
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is depicted in accordance with an illustrative embodiment. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The World Wide Web Consortium (W3C), which is the main international standards organization for the World Wide Web, has defined a "web service" as a software system designed to support interoperable machine-to-machine interaction over a network. That is, web services may refer to web-based applications that interact with other web-based applications in order to provide a desired service. For example, application software on a user's desktop computer may send messages via the Internet to a stock quote server in order to retrieve current stock quotes for selected stocks. The application software may then display the retrieved information within the application for the user. Other examples of common web services include banking, currency converters, airplane flight schedule lookups, auction services, and language translation services.

In a service oriented architecture providing web services, an enterprise service bus is a distributed software architecture implemented from a collection of middleware services which provides integration capabilities over a network. Middleware is a family of computer software that permits the interconnection, usually over a network, of disparate software components or applications possibly running across heterogeneous computing platforms. A middleware is often used to support complex distributed applications such as web servers, application servers, content management systems, and more generally to support all the software products and tools part of the information technology (IT) system of any modern large enterprise, company, and organization. Use of a middleware is also recognized as a solution to the problem of linking new applications to older legacy systems.

The enterprise service bus acts as an intermediary between disparate applications and enables the applications to communicate and send data back and forth to each other. For example, an application that requests a service may be referred to as the source application, and an application that provides the requested service may be referred to as the provider application. The request from the source application may be received by the enterprise service bus, which allows the applications to communicate by transforming and routing messages between the applications. The enterprise service bus may replace all direct contact with the applications on the bus, so that all communication among applications takes place via the bus. For instance, when the enterprise service bus receives a service request message from one application, it routes the message to the appropriate provider application.

The enterprise service bus may also convert the service request message, as the provider application may utilize different messaging formats and communication protocols from the source application. For example, the message may be converted from a Simple Object Access Protocol (SOAP) format over HyperText Transfer Protocol (HTTP) protocol to the SOAP format over Message Queue (MQ) protocol in order for the provider application to receive and service the request if the formal messaging protocol of the provider application is MQ instead of HTTP. The message may also be converted from the application format of the source application to a messaging format capable of being interpreted by the provider application.

In currently available enterprise service busses, an application connects to the enterprise service bus through a specific type of port. A port is a component of the Enterprise Service Bus through which an application connects and communicates with the Enterprise Service Bus. A conventional port has software components to handle a specific communication protocol and to extract the underlying message from a specific messaging format. Thus, a conventional port type is defined as a combination of the messaging format and the communication protocol needed for an application of a particular type to communicate with other applications connected to the enterprise service bus. An application type is also defined by the combination of the messaging format and communication protocol. In order to connect different applications to the enterprise service bus through which the applications are able to communicate with each other, the enterprise service bus requires different port types to handle the different applications. Currently, each port type handles a specific application type. As each port type connects an application of a specific type to the enterprise service bus, a port of a particular port type must be created for each new application that is connected to the enterprise service bus. For example, if the functionality and data of a new application have been exposed as an eXtensible Markup Language (XML) format with MQ as the transport protocol, a specific port type that caters to the XML format over MQ protocol is created and used to support that application. Similarly, a different specific port type must be created to connect and support another new application of a different application type.

Figure 3:
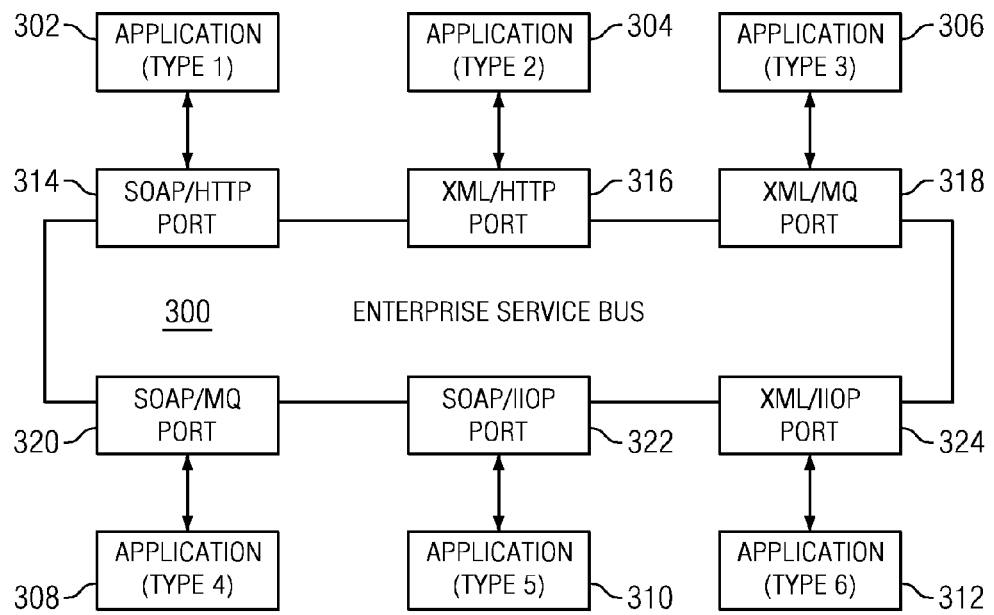
FIG. 3 is a block diagram that illustrates a known enterprise service bus architecture.

FIG. 3 is a block diagram that illustrates an example of existing enterprise service bus architectures in which a different port type exists for each type of application connected to the enterprise service bus. Enterprise service bus 300 is used as an intermediary to connect various kinds of applications and employing different port types. Each of applications 302-312 comprises a different application type, such as, for example, an application that uses SOAP over HTTP to communicate with the Enterprise Service Bus. As applications 302-312 comprise different types of applications, port types 314-324 are created to facilitate communications between applications 302-312 with each comprising a different port type. In this example, port types 314-324 comprise different combinations of a messaging format, such as XML and SOAP, and a communication protocol, such as HTTP, MQ, and Internet Inter-Orb Protocol (IIOP). For instance, for application 302, associated port type 314 uses a combination of a SOAP messaging format over HTTP messaging protocol. Likewise, port type 318 associated with application 306 uses an XML messaging format over MQ messaging protocol.

However, the current enterprise service bus architecture of having a separate port type for each type of application has several disadvantages. One problem with the existing separate port type approach is that it allows for limited scalability in terms of the types of applications being integrated. For every new application type added, a new port type must be developed and deployed. This development and deployment is both time consuming and developer resource intensive. In addition, this approach may not be practical in many situations, particularly if the number of types of applications is large, since one has to design, develop, and deploy a large number of port types. Another problem with this approach is that code developed for one port type may not be usable for another port type. There is also a high cost of developing a new port type for each new application type. Furthermore, if an application is updated or modernized, the existing port type being used is also likely to become obsolete as a result.

The illustrative embodiments provide a solution to the problems above by providing a computer implemented method, apparatus, and computer program product for providing an improved enterprise service bus for connecting various applications together. In contrast with existing systems which require the use of different port types for each application type, the illustrative embodiments provide a new enterprise service bus that employs a universal ESB port type. The universal ESB port type caters to and allows most or all application types to be connected to the enterprise service bus. The universal ESB port can connect many different types of applications to the enterprise service bus. The enterprise service bus in the illustrative embodiments drastically reduces the need for developing and deploying a new port type for each new application type, and thereby enables a greater re-use of development code.

The universal ESB port provides advantages to connecting software applications in an enterprise service bus in a similar manner as universal serial bus (USB) ports provide advantages to connecting computer hardware. Before the development of USB ports, in order to connect different hardware devices, such as a printer, a flash memory, or a removable hard drive, to a computer, different hardware port types for each device were required to exist on the computer. As each port type catered to a specific device type, a specific port type would have to be built into the computer to connect a new device type to the computer. With the recent development of USB ports, the need for separate port types for each hardware device type has been reduced drastically, and now almost any device may be connected to the computer using a single port type or USB port.

Figure 4A:
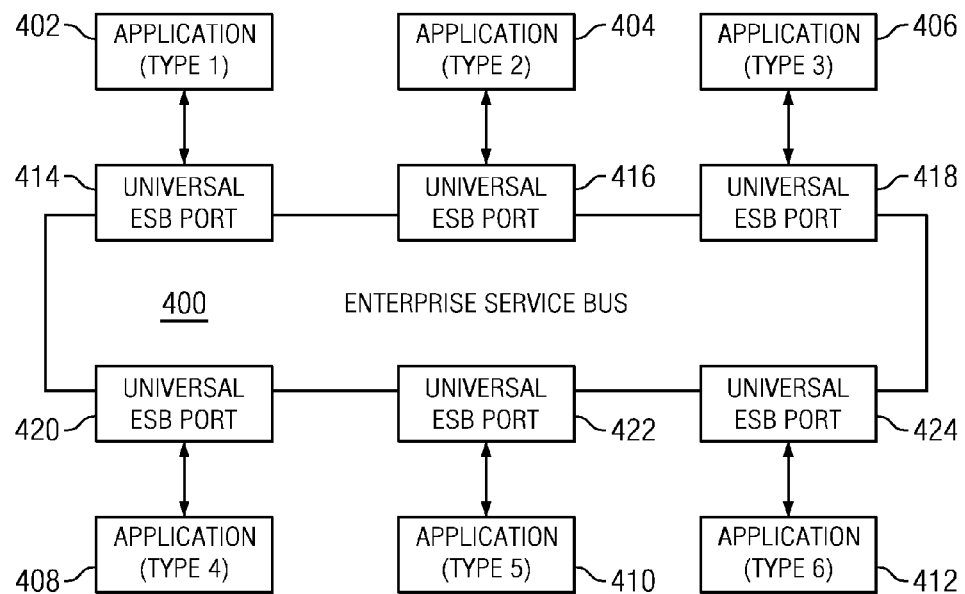
FIGS. 4A and 4B are block diagrams of high level overviews of enterprise service bus architectures comprising universal port types for connecting various applications in accordance with the illustrative embodiments.
Figure 4B:
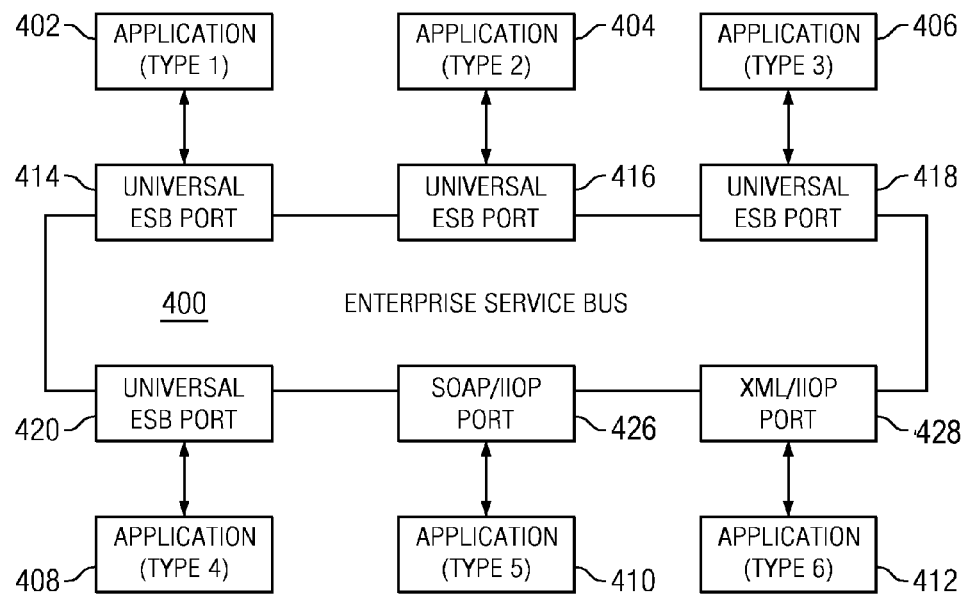

Turning now to FIGS. 4A and 4B, block diagrams of high level overviews of enterprise service bus architectures in accordance with the illustrative embodiments are shown. The enterprise service bus architectures in FIG. 4A and 4B provide a universal port type for connecting various applications in accordance with the illustrative embodiments. The enterprise service bus may be implemented on a computer (e.g., server 104 in FIG. 1) which is connected to the other computers through a network, such as network 102 in FIG. 1. The enterprise service bus may also be implemented in a distributed manner, in which case, the different components of the enterprise service bus may reside on one or more other computers connected together via network 102 in FIG. 1.

Enterprise service bus 400 is used as an intermediary to connect various kinds of application types, such that one application may request one or more services from one or more other connected applications. In FIG. 4A, enterprise service bus 400 connects various applications 402-412 via universal ESB ports 414-424. Although only universal ESB port types are illustrated in FIG. 4A, it should be noted that the illustrative embodiments may comprise any number of universal ESB ports and other known port types. For example, as illustrated in FIG. 4B, enterprise service bus 400 connects various applications 402-408 via universal ESB ports 414-420, respectively, and connects applications 410 and 412 via SOAP over IIOP port 426 and XML over IIOP port 428, respectively.

Applications 402-412 each comprise a different application type. An application has a type that is different from another application if its functionality and data have been exposed to other applications and the enterprise service bus using a combination of messaging format and communication protocol different from the other applications. Enterprise service bus 400 determines a provider application which to send the message from a requesting application using a core functionality of enterprise service busses of examining the content and context of the message to determine the provider application.

The universal ESB ports are ports comprising generic interfaces to enterprise service bus 400. A port is a part of the enterprise service bus. The universal ESB ports comprise a single type of port in which the applications may be connected to enterprise service bus 400. For example, universal ESB port 414 enables application 402 to interface with enterprise service bus 400, and universal ESB port 416 enables application 404 to interface with enterprise service bus 400. Universal ESB ports 414 and 416 are the same type of universal port. Thus, regardless of the type of application, a universal ESB port may be used to connect any of the applications to enterprise service bus 400. In contrast with conventional ports, such as port types 314-324 in FIG. 3 which only process messages related to a specific messaging format and communication protocol, the universal ESB ports first detect the communication protocol used by an application connected to the universal ESB port and then invoke a specific processor component that can process that protocol and extract the body of the message. The use of universal ESB ports eliminates or greatly reduces the need for developing code for and deploying a new port type for each new application type connected to enterprise service bus 400.

Figure 5:
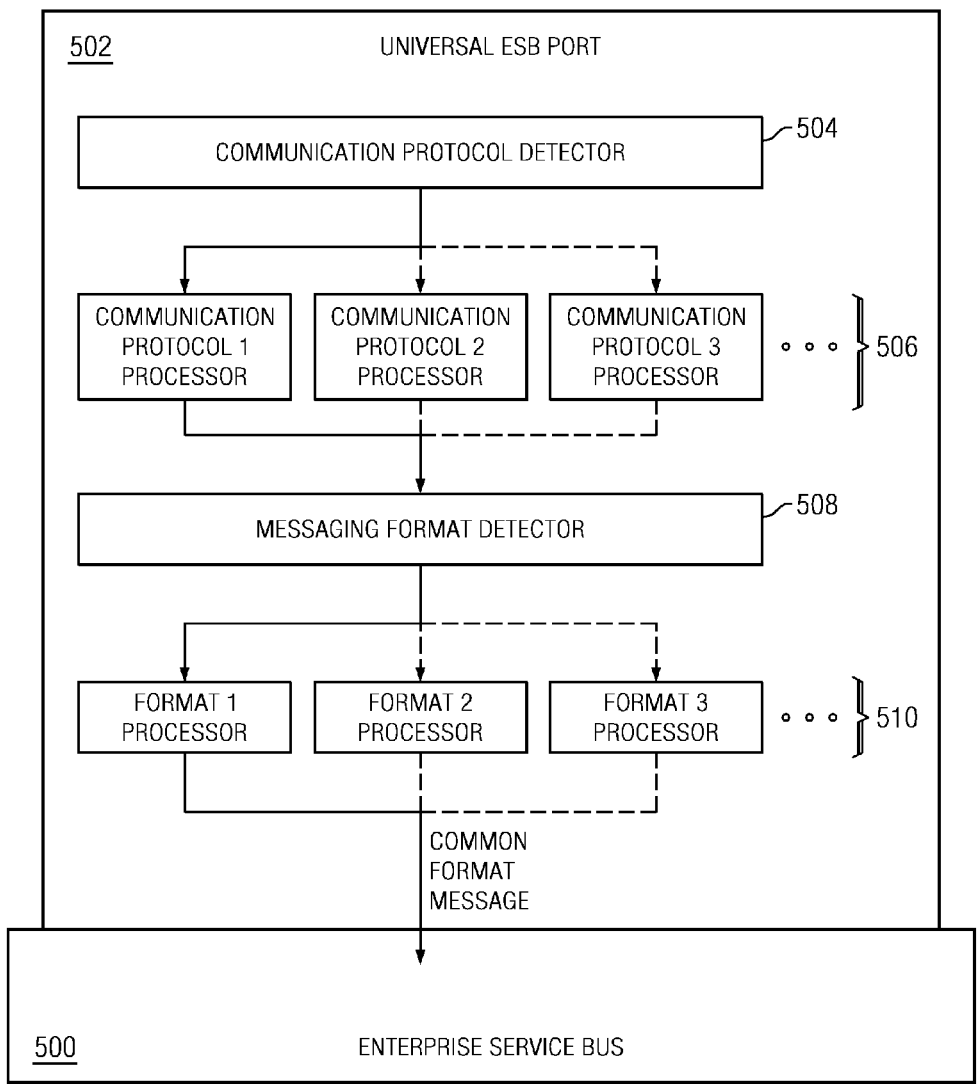
FIG. 5 is a block diagram of a universal ESB port and enterprise service bus architecture in one embodiment of the disclosure.

FIG. 5 is a block diagram of a universal ESB port and enterprise service bus architecture in one embodiment of the disclosure. In particular, FIG. 5 illustrates a universal ESB port in which communication protocol and messaging format detection and processing components are all implemented within the universal ESB port. Enterprise service bus 500 is an example of enterprise service bus 400 in FIGS. 4A and 4B. Enterprise service bus 500 is used as an intermediary to connect various kinds of application types. Universal ESB port 502 is representative of the universal ESB ports in FIGS. 4A and 4B and is shown in further detail.

Universal ESB port 502 is a port that provides a generic interface to an application to enable the application to connect to enterprise service bus 500 and communicate with other applications connected to enterprise service bus 500. Universal ESB port 502 comprises communication protocol detector 504, communication protocol processors 506, messaging format detector 508, and messaging format processors 510.

Communication protocol detector 504 comprises a software component in universal ESB port 502 that determines the communication protocol used by the application. In the simplest form, a communication protocol can be defined as a set of rules governing the syntax, semantics, and synchronization of communications. Communication protocol detector 504 may determine the communication protocol used by the application by intercepting and examining messages received from the application. An application may send a message to enterprise service bus 500 that requests a service from another application. For example, an application may send a message to enterprise service bus 500 through universal ESB port 502. As universal ESB port 502 is a universal port, the message may be in any messaging format, and the application may be using any communication protocol to send the message. Thus, the application may send a message to enterprise service bus 500 through universal ESB port 502 in any messaging format and using any communication protocol.

Upon intercepting a message from the application, communication protocol detector 504 in universal ESB port 502 examines the header of the message to determine the protocol in use by the application. Examples of communication protocols include, but are not limited to, HTTP, MQ, and IIOP, among others. Hypertext Transfer Protocol (HTTP) is an application-level protocol for distributed, collaborative, hypermedia information systems. HTTP is a request/response standard that is typical in client-server computing. Message queues provide an asynchronous communication protocol, meaning that the sender and receiver of the message do not need to interact with the message queue at the same time. Messages placed onto the queue are stored until the recipient retrieves them. IIOP (Internet Inter-Orb Protocol) is the implementation of General Inter-ORB Protocol (GIOP) for TCP/IP comprising an abstract protocol by which object request brokers (ORBs) communicate.

Communication protocol processors 506 comprise software components in universal ESB port 502 that process the intercepted messages according to the protocol identified by communication protocol detector 504. Communication protocol processors 506 comprise a separate processor for each communication protocol used, such as protocol processors 1, 2, and 3 as shown. Thus, communication protocol processors 506 may contain separate processors such as an HTTP processor for handling messages sent over HTTP, an SMTP processor for handling messages sent over SMTP, an IIOP processor for handling messages sent over IIOP, and the like. Communication protocol detector 504 forwards the message and the identified protocol used by the requesting application to the appropriate processor in communication protocol processors 506 that handles the identified protocol. For example, if an application uses HTTP, communication protocol detector 504 would forward the message to the HTTP processor in communication protocol processors 506. The processor may process the message by extracting the message body from the message. The message body is independent of the protocol being used by the application.

Messaging format detector 508 comprises software components in universal ESB port 502 that determine the message format of the message (i.e., the extracted message body). A message format defines the structure and form of the message. An example of such message format is a SOAP message. Another example of a message format is an XML document that confirms to a particular schema. A message may comprise one of many formats based on the message format used by the source application. The appropriate processor in communication protocol processors 506 forwards the extracted message body to messaging format detector 508 which identifies the format of the message. Example message formats include, but are not limited to, SOAP, (raw) XML, Copybook, among others. XML is a simple, flexible text format derived from SGML (ISO 8879). Raw XML as a messaging format uses a simple request and response mechanism to communicate between devices. SOAP is a specification for exchanging structured information that relies on XML as its message format and usually relies on other application layer protocols (most notably Remote Procedure Call (RPC) and HTTP) for message negotiation and transmission. Copybook comprises a messaging format based on assembly language that reflects the data structure of COBOL Copybook.

Messaging format processors 510 comprises software components in universal ESB port 502 that convert the extracted message body from the format that can be interpreted by enterprise service bus 500. In the context of this disclosure, data conversion is the term used to describe the mapping of data in one format to another format. Messaging format processors 510 comprise a separate processor for each messaging format protocol used, such as format processors 1, 2, and 3 as shown. Thus, messaging format processors 510 may contain separate processors, such as an XML processor for handling XML message formats, a SOAP processor for handling SOAP message formats, a Copybook processor for handling Copybook message formats, and the like. Messaging format processors 510 may comprise any known mechanism for converting messages from one format to another to enable enterprise service bus 500 to understand messages sent from source applications. In one embodiment, the message conversion process may include mapping (i.e. relocating) fields in an output message and translation (i.e. expressing values in a different code or convention). Upon receiving the message in the original format of the source application, the application processor in messaging format processors 510, with access to pre-stored format definitions and transformation rules for different applications in a repository (not shown), may map fields in the message to different relative positions in a re-formatted message and converting them as necessary to a common form which will be recognized by enterprise service bus 500. Messaging format processors 510 provides the message in the common format to enterprise service bus 500.

Figure 6:
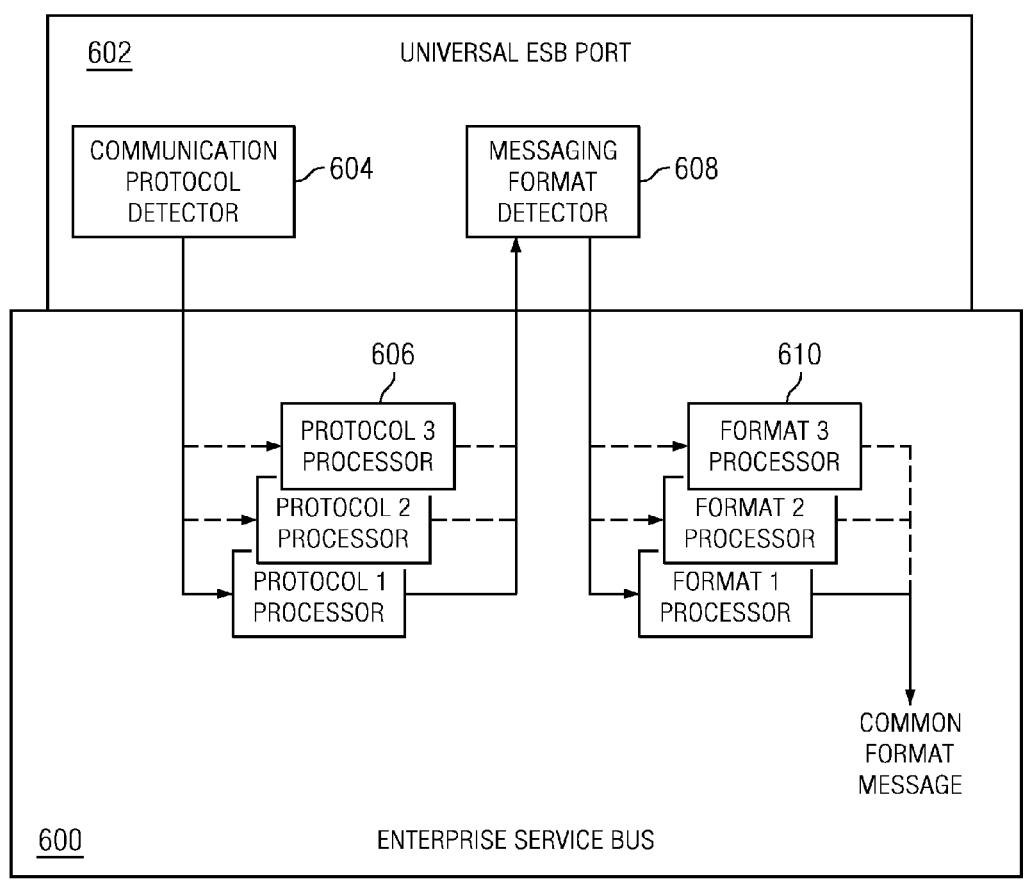
FIG. 6 is a block diagram of a universal ESB port and enterprise service bus architecture in another embodiment of the disclosure.
Figure 7:
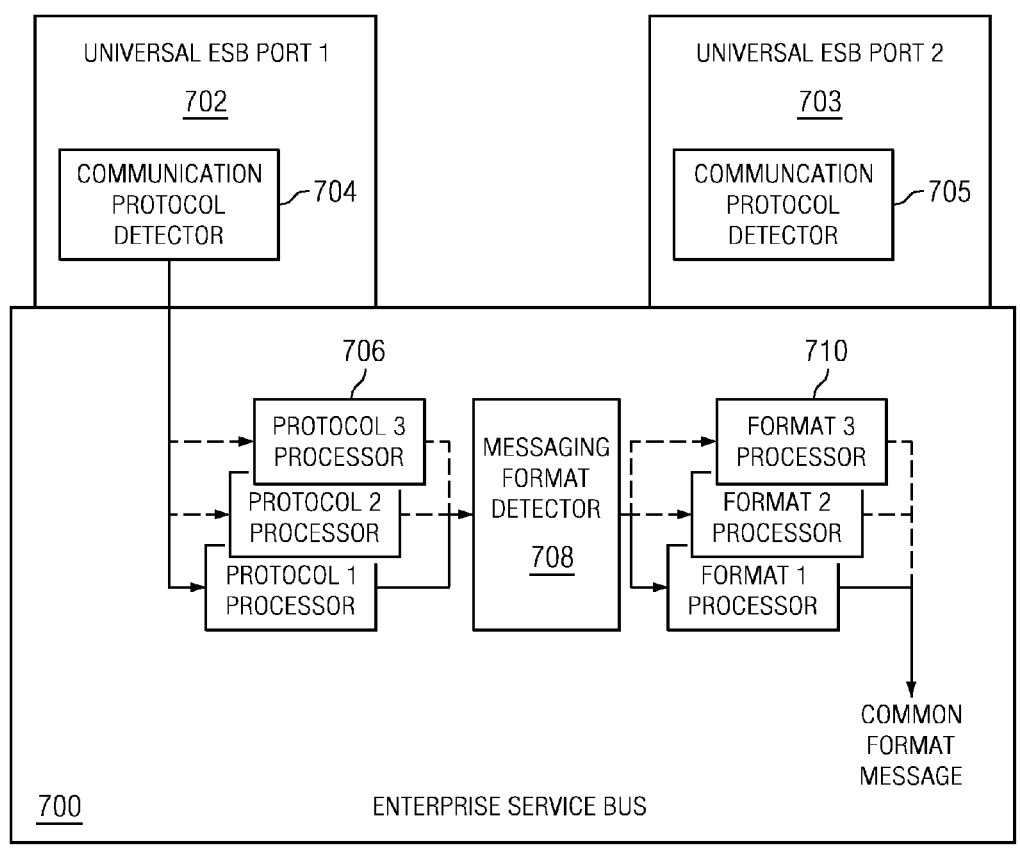
FIG. 7 is a block diagram of a universal ESB port and enterprise service bus architecture in another embodiment of the disclosure.

FIGS. 6 and 7 illustrate additional embodiments in which the detection and processing components for implementing aspects of the disclosure are distributed between the universal ESB port and the main body of the enterprise service bus. The main body of the enterprise service bus comprises the portion of the enterprise service bus other than the protocol and message format detection and processing as described in the illustrative embodiments. These detection and processing components may be distributed between the ESB port and the main body of the enterprise service bus in order to promote sharing of the components and code re-use by a plurality of universal ESB ports. In order to implement these additional embodiments, some messaging between the components remaining in the universal ESB port and the components moved into the main body of the enterprise service bus may be required.

In FIG. 6, a block diagram of a universal ESB port is shown in which communication protocol and messaging format detection components are implemented within the universal ESB port, and communication protocol and messaging format processing components are implemented within the main body of the enterprise service bus. Enterprise service bus 600 is an example of enterprise service bus 400 in FIGS. 4A and 4B. Enterprise service bus 600 is used as an intermediary to connect various kinds of application types. Universal ESB port 602 is representative of the universal ESB ports in FIGS. 4A and 4B and is shown in further detail. Although only one universal ESB port is shown, it should be noted that enterprise service bus 600 may comprise any number of universal ESB ports of which universal ESB port 602 is an example.

Similar to universal ESB port 502 in FIG. 5, universal ESB port 602 provides a generic interface to an application to enable the application to connect to enterprise service bus 600 and communicate with other applications connected to enterprise service bus 600. In contrast with universal ESB port 502 in FIG. 5 which comprises both detection and processing functions, universal ESB port 602 comprises communication protocol detector 604 and messaging format detector 608, while enterprise service bus 600 comprises communication protocol processors 606 and messaging format processors 610.

Communication protocol detector 604 comprises a software component in universal ESB port 602 that determines the communication protocol used by the application. Communication protocol detector 604 operates in a similar manner as communication protocol detector 504 in FIG. 5 by determining the protocol in use by an application from the application's message request.

Communication protocol processors 606 comprise software components in the main body of enterprise service bus 600 that process the intercepted messages according to the protocol identified by communication protocol detector 604. Communication protocol processors 606 operate in a similar manner as communication protocol processors 506 in FIG. 5 by using the appropriate protocol processor determined from communication protocol detector 604 to process the message and extract the message body. The appropriate communication protocol processor returns the message to messaging format detector 608 in universal ESB port 602.

Messaging format detector 608 comprises software components in universal ESB port 602 that determine the messaging format of the message. Messaging format detector 608 operates in a similar manner as messaging format detector 508 in FIG. 5 by receiving the extracted message body from communication protocol processors 606 and determining the messaging format used by the application from the message.

Messaging format processors 610 comprise software components in universal ESB port 602 that convert the extracted message body from the format used by the source application into a common format that can be interpreted by enterprise service bus 600. Messaging format processors 610 operate in a similar manner as messaging format processors 510 in FIG. 5 by using the appropriate messaging format processor determined from messaging format detector 608 to process and convert the message into a common format understandable by enterprise service bus 600. Messaging format processors 610 then provide the message in the common format to the main body of enterprise service bus 600.

In FIG. 7, universal ESB ports are shown in which communication protocol detection components are implemented within the universal ESB ports, and communication protocol processing, messaging format detection, and messaging format processing components are implemented within the main body of the enterprise service bus. Enterprise service bus 700 is an example of enterprise service bus 400 in FIG. 4. Enterprise service bus 700 is used as an intermediary to connect various kinds of application types. Universal ESB ports 702 and 703 are representative of the universal ESB ports in FIGS. 4A and 4B and are shown in further detail. Although two universal ESB ports are shown, it should be noted that enterprise service bus 700 may comprise any number of universal ESB ports of which universal ESB ports 702 and 703 are examples.

Similar to universal ESB port 502 in FIG. 5, universal ESB port 702 provides a generic interface to an application to enable the application to connect to enterprise service bus 700 and communicate with other applications connected to enterprise service bus 700. In contrast with universal ESB port 502 in FIG. 5, universal ESB ports 702 and 703 comprise communication protocol detectors 704 and 705, respectively, while enterprise service bus 700 comprises communication protocol processors 706, messaging format detector 708, and messaging format processors 710. Each component (communication protocol detector 704, communication protocol processors 706, messaging format detector 708, and messaging format processors 710) may operate in a similar manner as communication protocol detector 504, communication protocol processors 506, messaging format detector 508, and messaging format processors 510 described in FIG. 5, respectively.

Figure 8:
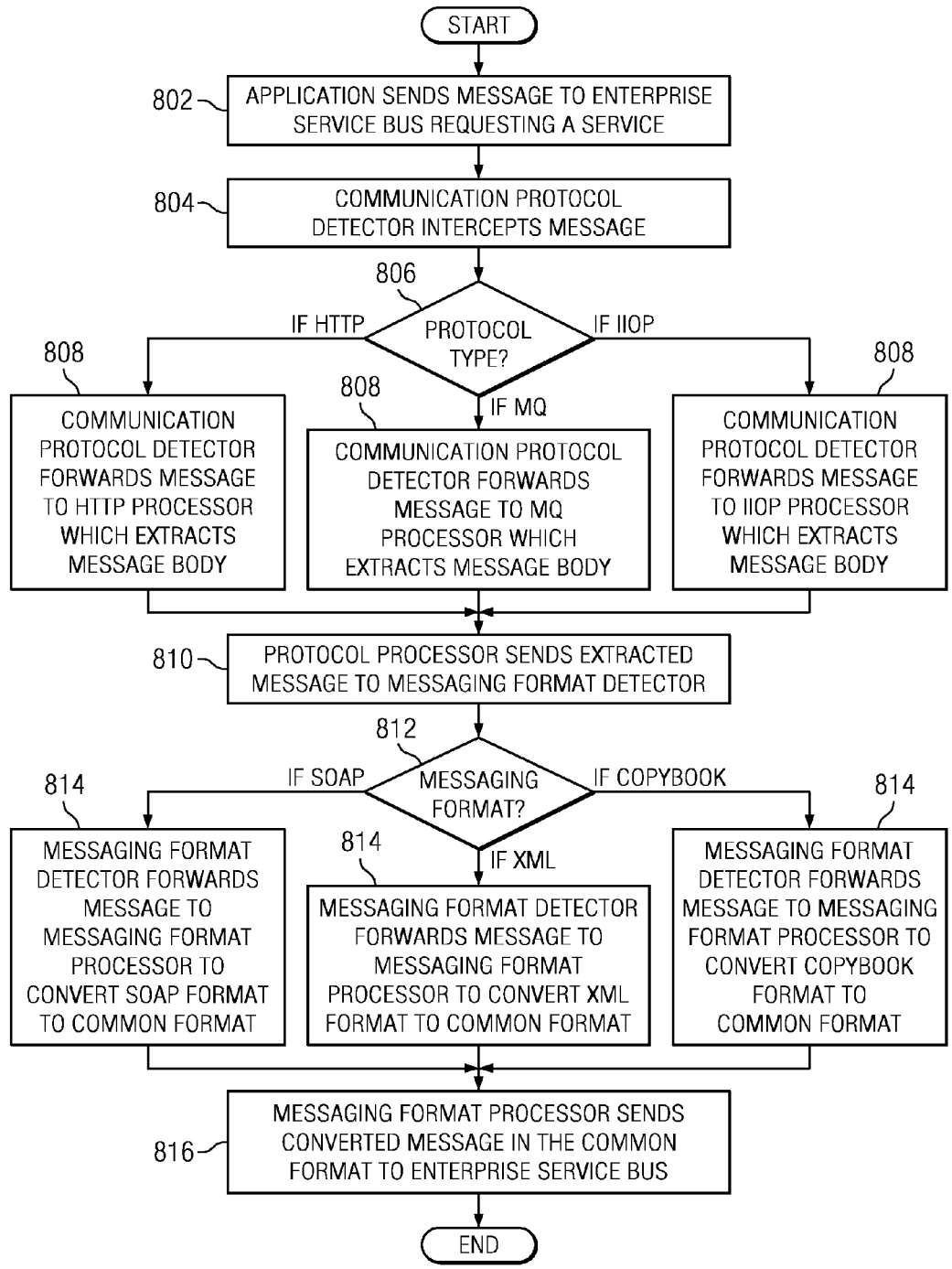
FIG. 8 is a flowchart of a process for using a universal ESB port type in an enterprise service bus to connect various applications together to share functionality and data owned by one application across all applications connected to the enterprise service bus in accordance with the illustrative embodiments.

FIG. 8 is a flowchart of a process for using a universal port type in an enterprise service bus to connect various applications together to share functionality and data owned by one application across all applications connected to the enterprise service bus in accordance with the illustrative embodiments. The process described in FIG. 8 may be implemented using enterprise service bus 400 with universal bus ports in FIG. 4.

The process begins when an application connects to the enterprise service bus through a universal ESB port and sends a message to the enterprise service bus requesting a service (step 802). The message may comprise any messaging format and be sent using any communication protocol. The message is intercepted by a communication protocol detector of the requesting application (step 804). The communication protocol detector may be located within the universal port connecting the requesting application to the enterprise service bus. The communication protocol detector determines the communication protocol being used by the requesting application (step 806).

Once the communication protocol detector determines the communication protocol used by the requesting application, the message is forwarded to an appropriate protocol processor that extracts the body of the message, as the message body is independent of the protocol being used by the application (step 808). The appropriate protocol processor may be located within the universal port of the application as shown in FIG. 5 or alternatively within the enterprise service bus as shown in FIGS. 6 and 7. A protocol processor exists for each communication protocol. Thus, separate protocol processor components may be used for HTTP, SMTP, HOP, JMS, among others.

The protocol processor then sends the extracted message body to a messaging format detector (step 810). The messaging format detector may be located within the universal port of the application as shown in FIG. 5 or alternatively within the enterprise service bus as shown in FIGS. 6 and 7. The messaging format detector is a software component that determines the format of the received message. Examples of messaging formats include SOAP, (raw) XML, Copybook, among others. Once the messaging format is determined (step 812), the messaging format detector forwards the extracted message body to an appropriate messaging format processor for converting the current messaging format into a common message format, which the remaining ESB understands (step 814). The universal ESB port then sends the common format message to the enterprise service bus (step 816) with the process terminating thereafter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for enabling communications between applications connected to an enterprise service bus via a plurality of ports, the computer implemented method comprising:
receiving, from a source application in a set of applications connected to the enterprise service bus, a message requesting a service from another application in the set of applications, wherein each application in the set of applications is connected to the enterprise service bus via a unique port in the plurality of ports, and wherein each application uses a different combination of messaging format and communication protocol;
determining whether the unique port is a universal enterprise service bus port;
responsive to a determination that the unique port is a universal enterprise service bus port, performing a set of sub-processes using the message comprising:
determining, using the message received, a communication protocol of the source application;
processing the message to extract a body of the message;
examining the body to determine the messaging format of the source application;
converting the message from the messaging format of the source application to a common messaging format understandable by the enterprise service bus to form a common formatted message; and
sending the common formatted message to a main body of the enterprise service bus.

2. The computer implemented method of claim 1, wherein each of the applications in the set of applications is connected to the enterprise service bus via a port type of the universal enterprise service bus port.

3. The computer implemented method of claim 1, wherein at least one application in the set of applications is connected to the enterprise service bus via the universal enterprise service bus port, and wherein at least one other application in the set of applications is connected to the enterprise service bus via a port type comprising a particular messaging format and communication protocol.

4. The computer implemented method of claim 1, wherein the set of sub-processes is performed by the universal enterprise service bus port associated with the source application.

5. The computer implemented method of claim 1, wherein the determining and examining in the set of sub-processes are performed by the universal enterprise service bus port associated with the source application, and wherein the processing and converting in the set of sub-processes are performed by the enterprise service bus.

6. The computer implemented method of claim 5, wherein the processing in the set of sub-processes is performed by an appropriate communication protocol processor in a set of communication protocol processors and the converting in the set of sub-processes is performed by an appropriate message format processor in a set of messaging format processors, and wherein the set of communication protocol processors and the set of messaging format processors are shared by other universal enterprise service bus ports in the enterprise service bus.

7. The computer implemented method of claim 1, wherein the determining in the set of sub-processes is performed by the universal enterprise service bus port associated with the source application, and wherein the processing, examining, and converting in the set of sub-processes are performed by the enterprise service bus.

8. The computer implemented method of claim 7, wherein the processing in the set of sub-processes is performed by an appropriate communication protocol processor in a set of communication protocol processors, the converting in the set of sub- processes is performed by an appropriate message format processor in a set of messaging format processors, and the examining in the set of sub-processes is performed by a messaging format detector, and wherein the set of communication protocol processors, the set of messaging format processors, and the messaging format detector are shared by other universal enterprise service bus ports in the enterprise service bus.

9. The computer implemented method of claim 1, wherein the universal enterprise service bus port is capable of receiving and processing messages in a plurality of differing supported messaging formats and a plurality of differing supported communication protocols.

10. The computer implemented method of claim 1, wherein determining the communication protocol of the source application further comprises:
examining a header of the message to identify the communication protocol in use by the source application.

11. The computer implemented method of claim 1, wherein processing the message further comprises:
- responsive to a determination of the communication protocol of the source application identifying a determined communication protocol, providing the message to an appropriate protocol processor in a set of protocol processors that is dedicated to handling messages using the determined communication protocol; and
- extracting the body of the message using the appropriate protocol processor.

12. The computer implemented method of claim 1, wherein converting the message further comprises:
- responsive to a determination of the messaging format of the source application identifying a determined messaging format, providing the message to an appropriate messaging format processor in a set of messaging format processors that is dedicated to handling messages in the determined messaging format; and
- converting the message to a common messaging format understandable by the enterprise service bus using the appropriate messaging format processor.

13. A computer program product for enabling communications between applications connected to an enterprise service bus via a plurality of ports, the computer program product comprising:
- a non-transitory computer recordable storage medium having computer readable program code stored thereon, the computer readable program code for execution by a computer, comprising:
- computer readable program code for receiving, from a source application in a set of applications connected to the enterprise service bus, a message requesting a service from another application in the set of applications, wherein each application in the set of applications is connected to the enterprise service bus via a unique port, and wherein each application uses a different combination of messaging format and communication protocol;
- computer readable program code for determining whether the unique port is a universal enterprise service bus port;
- computer readable program code responsive to a determination that the unique port is a universal enterprise service bus port for performing a set of sub-processes using the message comprising:
- computer readable program code for determining, using the message, a communication protocol of the source application;
- computer readable program code for processing the message to extract a body of the message;
- computer readable program code for examining the body to determine the messaging format of the source application;
- computer readable program code for converting the message from the messaging format of the source application to a common messaging format understandable by the enterprise service bus to form a common formatted message; and
- computer readable program code for sending the common formatted message to a main body of the enterprise service bus.

14. The computer program product of claim 13, wherein the computer readable program code for the set of sub-processes is executed by the universal enterprise service bus port associated with the source application.

15. The computer program product of claim 13, wherein the computer readable program code for determining and the computer readable program code for examining is executed by the universal enterprise service bus port associated with the source application, wherein the computer readable program code for processing is executed by an appropriate communication protocol processor in a set of communication protocol processors in the enterprise service bus, wherein the computer readable program code for converting is executed by an appropriate message format processor in a set of messaging format processors in the enterprise service bus, and wherein the set of communication protocol processors and the set of messaging format processors are shared by other universal enterprise service bus ports in the enterprise service bus.

16. The computer program product of claim 13, wherein the computer readable program code for determining is executed by the universal enterprise service bus port associated with the source application, wherein the computer readable program code for processing is executed by an appropriate communication protocol processor in a set of communication protocol processors in the enterprise service bus, wherein the computer readable program code for examining is executed by a messaging format detector in the enterprise service bus, wherein the computer readable program code for converting is executed by an appropriate message format processor in a set of messaging format processors in the enterprise service bus, and wherein the set of communication protocol processors, the set of messaging format processors, and the messaging format detector are shared by other universal enterprise service bus ports in the enterprise service bus.

17. The computer program product of claim 13, wherein the universal enterprise service bus port is capable of receiving and processing messages in a plurality of differing supported messaging format and a plurality of differing supported communication protocols.

18. The computer program product of claim 13, wherein the computer readable program code for processing the message further comprises:
- computer readable program code for providing, in response to a determination of the communication protocol of the source application identifying a determined communication protocol, the message to an appropriate protocol processor in a set of protocol processors that is dedicated to handling messages using the determined communication protocol; and
- computer readable program code for extracting the body of the message using the appropriate protocol processor.

19. The computer program product of claim 13, wherein the computer readable program code for converting the message further comprises:
- computer readable program code for providing, in response to a determination of the messaging format of the source application identifying a determined message format, the message to an appropriate messaging format processor in a set of messaging format processors that is dedicated to handling messages in the determined messaging format; and
- computer readable program code for converting the message to a common messaging format understandable by the enterprise service bus using the appropriate messaging format processor.

20. An apparatus comprising:
- a communication fabric;
- a memory connected to the communication fabric, wherein the memory contains computer readable program code for execution stored therein;
- an enterprise service bus, wherein the enterprise service bus comprises a plurality of ports providing an interface to the enterprise service bus;

a processor unit, connected to the communication fabric, wherein the processor unit executes the computer readable program code, to direct the apparatus to:

receive, from a source application in a set of applications connected to the enterprise service bus, a message requesting a service from another application in the set of applications, wherein each application in the set of applications is connected to the enterprise service bus via a unique port in the plurality of ports, and wherein each application uses a different combination of messaging format and communication protocol;

determine whether the unique port is a universal enterprise service bus port;

responsive to a determination that the unique port is a universal enterprise service bus port, perform a set of sub-processes using the message comprising:

determine, using the message received, a communication protocol of the source application;

process the message to extract a body of the message;

examine the body to determine the messaging format of the source application;

convert the message from the messaging format of the source application to a common messaging format understandable by the enterprise service bus to form a common formatted message; and send the common formatted message to a main body of the enterprise service bus.

* * * * *